United States Patent [19]

Gaalema et al.

[11] 4,445,117

[45] Apr. 24, 1984

[54] TRANSISTORIZED FOCAL PLANE HAVING FLOATING GATE OUTPUT NODES

[75] Inventors: Steven D. Gaalema; Michael D. Jack, both of Carlsbad, Calif.

[73] Assignee: Hughes Aircraft Company, Culver City, Calif.

[21] Appl. No.: 335,131

[22] Filed: Dec. 28, 1981

[51] Int. Cl.³ .................... H04Q 9/00; H04N 3/12; H04J 40/14
[52] U.S. Cl. .................... 340/825.91; 358/212
[58] Field of Search .......... 348/825.9, 825.91, 825.93; 358/213, 212

[56] References Cited

U.S. PATENT DOCUMENTS 4,107,474 8/1978 Schneider ...................... 340/825.9
4,274,113 6/1981 Ohba et al. ...................... 358/213
4,385,321 5/1983 Malm ...................... 358/213
4,390,791 6/1983 Hatanaka et al. ...................... 358/213

Primary Examiner—Donald J. Yusko
Attorney, Agent, or Firm—Joseph E. Szabo; William J. Bethurum; Anthony W. Karambelas

[57] ABSTRACT

A transistorized monolithic focal plane array is formed on a semiconductive substrate and comprises a plurality of detectors associated with a corresponding plurality of source follower or inverter transistors. The array is row addressable. The gate of the source follower transistor comprises a floating node which is charged by the corresponding detector in proportion to the incident photon flux, the gate being periodically reset. The invention combines the advantages of compactness and low capacitance of charge coupled device imagers and low noise characteristics of prior art imagers comprising discrete transistors.

9 Claims, 15 Drawing Figures

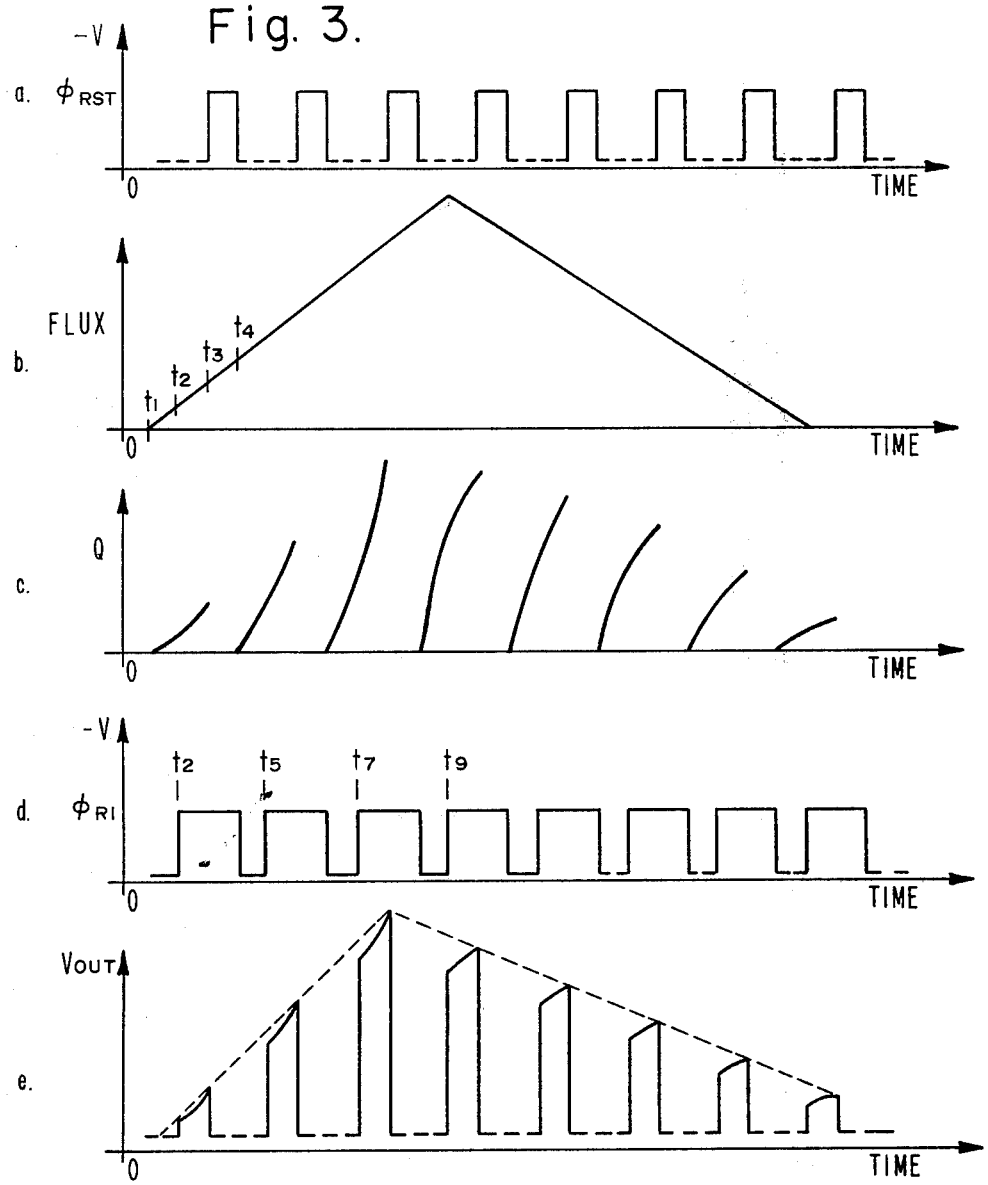

TRANSISTORIZED FOCAL PLANE HAVING FLOATING GATE OUTPUT NODES

TECHNICAL FIELD

This invention is related to electronic imaging devices comprising a plurlity of photosensitive semiconductive detectors, each detector associated with a transistorized output amplifier.

BACKGROUND ART

Electronic imagers comprising a plurality of semiconductive photosensitive detectors may be classified according to the type of output circuit which amplifies the photodetector signal. Specifically, in one type of imager, the output circuit comprises a plurality of discrete amplifiers, each amplifier being connected to amplify the signal from a corresponding one of the photodetectors. If the detectors are sensitive to infrared radiation, they are all located inside a cool environment such as a double-walled glass container, called a Dewar flask, and connected to discrete amplifiers located outside of the Dewar. Such an arrangement suffers from the disadvantage that it is bulky and has significant capacitance due to the distance between the detector array located in the Dewar and the amplifiers located outside of it.

These disadvantages are overcome in the prior art by forming the detector array over a semiconductive substrate, the substrate also supporting the output circuitry which comprises a charge coupled device. The entire substrate is contained inside the Dewar. Such an imager is commonly known as a charge coupled device imager and suffers from the disadvantage that charge coupled devices are inherently more noisy than the transistorized amplifiers referred to above.

Accordingly, it is an object of this invention to make an imager having the compactness and low capacitance of charge coupled device imagers without their noisy characteristics.

SUMMARY OF THE INVENTION

In the present invention, a photosensitive detector array is formed on a semiconductive substrate, and an output circuit associated with each detector, comprising a plurality of metal oxide semiconductor field effect transistors, is formed in an epitaxial semiconductive layer on the same substrate. The transistorized output circuits associated with each of the detectors have low noise characteristics, representing a significant improvement over charge coupled device imagers of the prior art. Furthermore, the monolithic arrangement of the detectors and transistors brings to an absolute minimum the distances between detectors and transistors, thus minimizing capacitance in the system, a significant improvement over the discrete transistorized amplifier imagers of the prior art.

In the preferred embodiment of the present invention, the detector array is organized by row and column. Each of the detectors is row addressable and is connected to the gate of a source follower metal oxide semiconductor field effect transistor (MOSFET). The gate of the source follower MOSFET stores charge output from the corresponding detector in response to incident radiation, the potential of the gate floating but being periodically reset. The source of the source follower transistor is the output terminal while the drain of the source follower transistor is periodically connected through an enable MOSFET to a drain voltage source. Resetting of the floating gate potential is accomplished by a dual gate MOSFET, one of the dual gates being connected to a periodic reset clock signal and the other gate being connected to the gate of the enable transistor and to a row enable clock signal. Row enable clock signals may be generated by a circuit on the same substrate to reduce the number of external connections (or "pin-out") of the integrated circuit.

In an alternative embodiment of the invention, an inverter is substituted for the source follower transistor.

DESCRIPTION OF THE DRAWINGS

The invention is best understood by reference to the accompanying drawings, of which:

FIG. 3 includes clocking diagrams illustrating an exemplary operation of one detector row of the focal plane illustrated in FIG. 2, of which:

FIG. 3a is a diagram of the time domain waveform of the clock signal $\phi_{rst}$;

FIG. 3b is a diagram of an exemplary time domain waveform of photon flux incident on one of the detectors of FIG. 2;

FIG. 3c is a diagram of the time domain waveform of the charge stored on a corresponding floating gate of FIG. 2 in accordance with the exemplary photon flux diagram of FIG. 3b;

FIG. 3d is a diagram of the time domain waveform of the row enable clock signal $\phi_{R1}$; and FIG. 3e is a diagram of the time domain waveform of the source voltage $V_{out}$ of a source follower transistor in the focal plane of FIG. 2 corresponding to the example of FIG. 3b; and FIG. 4 is a timing diagram on a time scale reduced from that of FIG. 3, and illustrates the overall operation of the entire focal plane of FIG. 2, of which:

FIG. 4a is a diagram of the time domain waveform of the clock signal $\phi_{rst}$;

FIG. 4b is a diagram of the time domain waveform of the clock signal $\phi_{R1}$;

FIG. 4c is a diagram of the time domain waveform of the clock signal $\phi_{R2}$;

FIG. 4d is a diagram of the time domain waveform of the clock signal $\phi_{R3}$;

FIG. 4e is a diagram of the time domain waveform of the clock signal $\phi_{R4}$;

DETAILED DESCRIPTION

Figure 1:
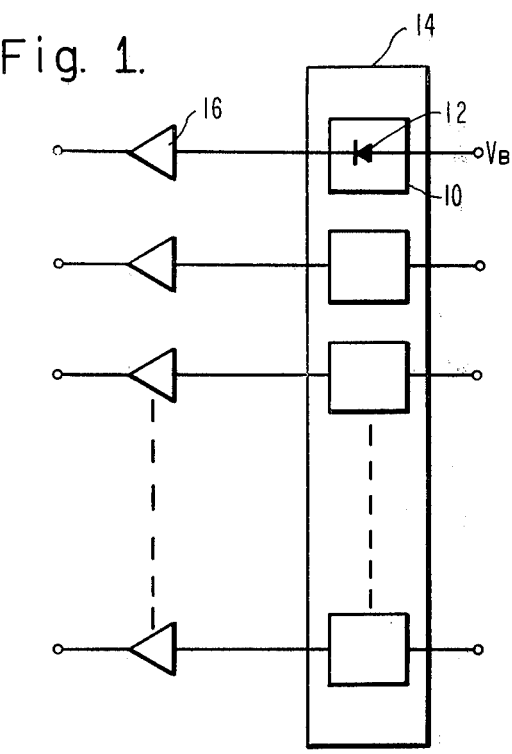
FIG. 1 is a simplified schematic diagram of a prior art imager having an output circuit comprising a plurality of discrete amplifiers.

FIG. 1 is a simplified schematic diagram of a prior art imager comprising a plurality of photodetectors 10 each comprising a photosensitive semiconductor 12, the semiconductor 12 being sensitive to infrared radiation. The detectors 10 are located inside a Dewar 14 which maintains them at a temperature below, for example, the boiling point of nitrogen in order to reduce detector noise. Each of the detectors 10 is connected to a discrete output amplifier 16 located outside of the Dewar 14. The disadvantage of the prior art imager of FIG. 1 is that the connection between the diode 12 and the amplifier 16 must necessarily be of significant length due to the presence of the Dewar 14, which introduces capacitance into the system.

Another type of imager, not illustrated, is the charge coupled device imager of the type disclosed in Sequin et al., *Charge Transfer Devices,* Academic Press, New York, 1975, at pages 142–200. The advantage of the charge coupled device imager is that a charge coupled device output circuit is substituted for the discrete amplifiers 16, the charge coupled device being formed on the same semiconductive substrate with all of the photosensitive diodes, thus minimizing capacitance in the system. However, charge coupled device output circuits suffer from the limitation that they are inherently more noisy than transistorized output circuits.

Figure 2:
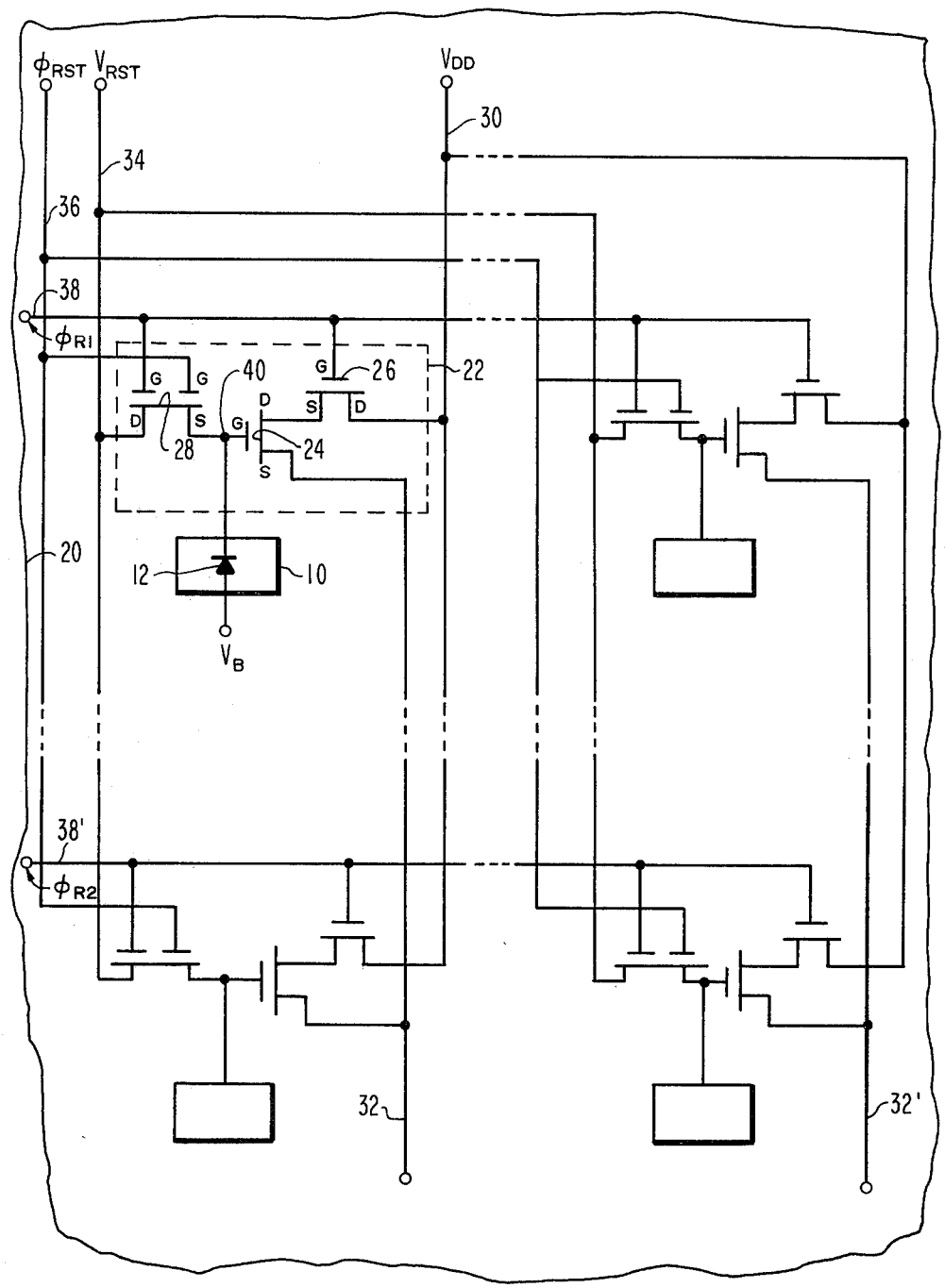
FIG. 2 is a simplified schematic diagram of the preferred embodiment of the focal plane of the present invention.

The foregoing disadvantages are overcome in the imager of the present invention, a monolithic transistorized photodetector array illustrated in the simplified schematic diagram of FIG. 2. Each of the detectors 10 is formed on a common semiconductive substrate 20 of n-type conductivity, each of them being an extrinsic bulk photoconductive detector with n-type contacts in the surface of the substrate 20. Each detector 10 is connected to a transistorized output circuit 22 formed in an overlying p-type epitaxial layer (not shown) on the same substrate 20. The output circuit 22 comprises a source follower metal oxide semiconductor transistor (MOSFET) 24, an enable MOSFET 26 and a dual gate reset MOSFET 28. The drain of the enable transistor 26 is connected to a column bias line 30, the source of the enable transistor 26 being connected to the drain of the source follower 24. The source of the source follower transistor 24 is connected to a column output line 32. The gate of the source follower transistor 24 is connected to the output of the photodetector 10 and is also connected through the source and drain of the reset transistor 28 to a reset voltage line 34. One of the gates of the dual gate reset transistor 28 is connected to a reset clock line 36 while the other gate is connected to a row enable line 38.

The gate of the source follower transistor 24 accumulates charge output from the detector 10 in response to an incident photon flux, the charge accumulated determining the source voltage of the source follower transistor 24. The gate of the source follower transistor 24 comprises a floating output node 40 which is periodically reset by the dual gate reset transistor 28 in synchronism with a reset clock signal $\phi_{rst}$ applied to the reset clock line 36 and a row enable clock signal $\phi_{R1}$ applied to row enable line 38.

Each of the row enable lines 38 in the array of FIG. 2 is connected to receive a different row enable clock signal $\phi_{R1}$, $\phi_{R2}$, etc. so that the array is row addressable, each of the column output lines 32 carrying an output voltage representing the output signal of the corresponding detectors in the selected row.

The advantage of the output circuit 22 of FIG. 2 is that the source follower transistor 24 has a gain on the order of unity in accordance with well known principles. The gain of the output circuit 22 may be determined by simply selecting the appropriate gate width and source-to-drain spacing of the source follower transistor 24.

A significant feature of the output circuit 22 is that the transistors 24, 26, 28 have inherently lower noise characteristics than a charge coupled device output circuit of the prior art, while the integration of the transistors 24, 26, 28 on the same substrate with the detector 10 provides the compactness and device density of a charge coupled device imager. Accordingly, the imager of FIG. 2 has inherently low noise characteristics and low system capacitance, a significant advantage.

Figure 4:
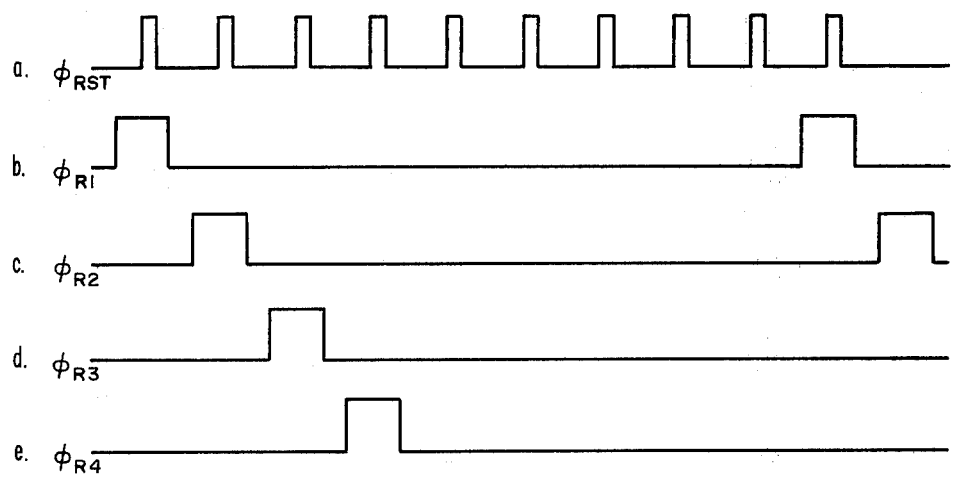

Overall operation of the imager of FIG. 2 is best understood by reference to the clock diagrams of FIG. 4. Referring to FIG. 4, each time the clock signal $\phi_{rst}$ is turned "on", a different one of the row enable clock signals $\phi_{R1}$, $\phi_{R2}$, $\phi_{R3}$, $\phi_{R4}$, $\phi_{R4}$, etc. is also turned "on". Accordingly, the clock signal $\phi_{rst}$ of FIG. 4a has a frequency $F_{rst}$ which is greater than the frequency $F_r$ of each of the row enable clock signals $\phi_{R1}$, $\phi_{R2}$, $\phi_{R3}$, etc. of FIG. 4b, 4c, 4d. The ratio $F_{rst}/F_r$ is equal to N, the number of detector rows or row enable lines 38 in the array of FIG. 2. Each of the N row enable lines 38 receives a corresponding one of the row enable clock signals $\phi_{R1}$, $\phi_{R2}$, etc. in synchronism with the reset clock signal $\phi_{rst}$. Accordingly, the voltage at each of the column output lines 32 is controlled by a corresponding one of the detectors in succeeding rows at different times.

A detailed description of the operation of one row of the imager of FIG. 2 will now be given with reference to the clock diagrams of FIG. 3. FIG. 3b illustrates an exemplary time domain waveform of the incident image photon flux which, in order to simplify the discussion herein, is a triangular waveform. FIG. 3c illustrates the charge Q stored on the node 40 as a function of time. FIG. 3e illustrates the source voltage $V_{out}$ of the source follower transistor 24 as a function of time.

At time $t_1$, charge generated by the detector 10 begins to accumulate on the node 40. At time $t_2$, the row enable clock signal $\phi_{R1}$ is applied to the first row enable line 38, thus turning on the enable transistor 26. Accordingly, the voltage $V_{dd}$ on the column bias supply line 30 is applied to the drain of the source follower transistor 24. As a result, at time $t_2$ the source voltage $V_{out}$ of the source follower transistor 24 assumes a level which is proportional to the charge Q stored on the node 40.

At time $t_3$, the clock signal $\phi_{rst}$ turns on. The clock signals $\phi_{rst}$ and $\phi_{R1}$ remain on until time $t_4$. Therefore, both gates of the dual gate reset transistor 28 are turned on from time $t_3$ to time $t_4$ so that the output node 40 is connected through the source and drain of the reset transistor 28 to the reset voltage line 34 and a reset voltage is applied to the node 40. Accordingly, the source voltage $V_{out}$ of the transistor 24 is reset to $V_{rst}$ from time $t_3$ to time $t_4$. As illustrated in FIG. 3c, the charge Q stored on the node 40 is simultaneously reset to zero. At time $t_4$, the clock signals $\phi_{rst}$ and $\phi_{R1}$ are turned off, and the same process is repeated in succeeding detector rows, commencing with the next row enable line 38'.

The output node 40 again accumulates charge output by the photodetector 10 beginning at time $t_4$. At time $t_5$, the first row is again enabled by the clock signal $\phi_{R1}$. This time, however, the output voltage $V_{out}$ (FIG. 3c) is greater, due to the rising photon flux illustrated in FIG. 3b. The cycle is repeated periodically at times $t_7$, $t_9$, etc. Comparing FIGS. 3b and 3e, it is seen that the sampled source voltage $V_{out}$ (indicated in dashed line in FIG. 3e) follows the triangular waveform of the photon flux of FIG. 3b.

FIG. 3 is not necessarily to scale in that the ratio of the time intervals $t_2$ to $t_4$ and $t_4$ to $t_5$ is proportional to the number of rows, n, present in the detector array. Thus, $t_5 - t_4 = n(t_4 - t_2)$.

In the presently preferred embodiment of FIG. 2, each of the transistors 24, 26, 28 comprises an n-channel MOSFET formed in a p-type epitaxial layer over the substrate 20, and each of the clock signals $\phi_{rst}$, $\phi_{R1}$, $\phi_{R2}$, etc. is turned "on" to a positive voltage and turned off to zero voltage.

Figure 5:
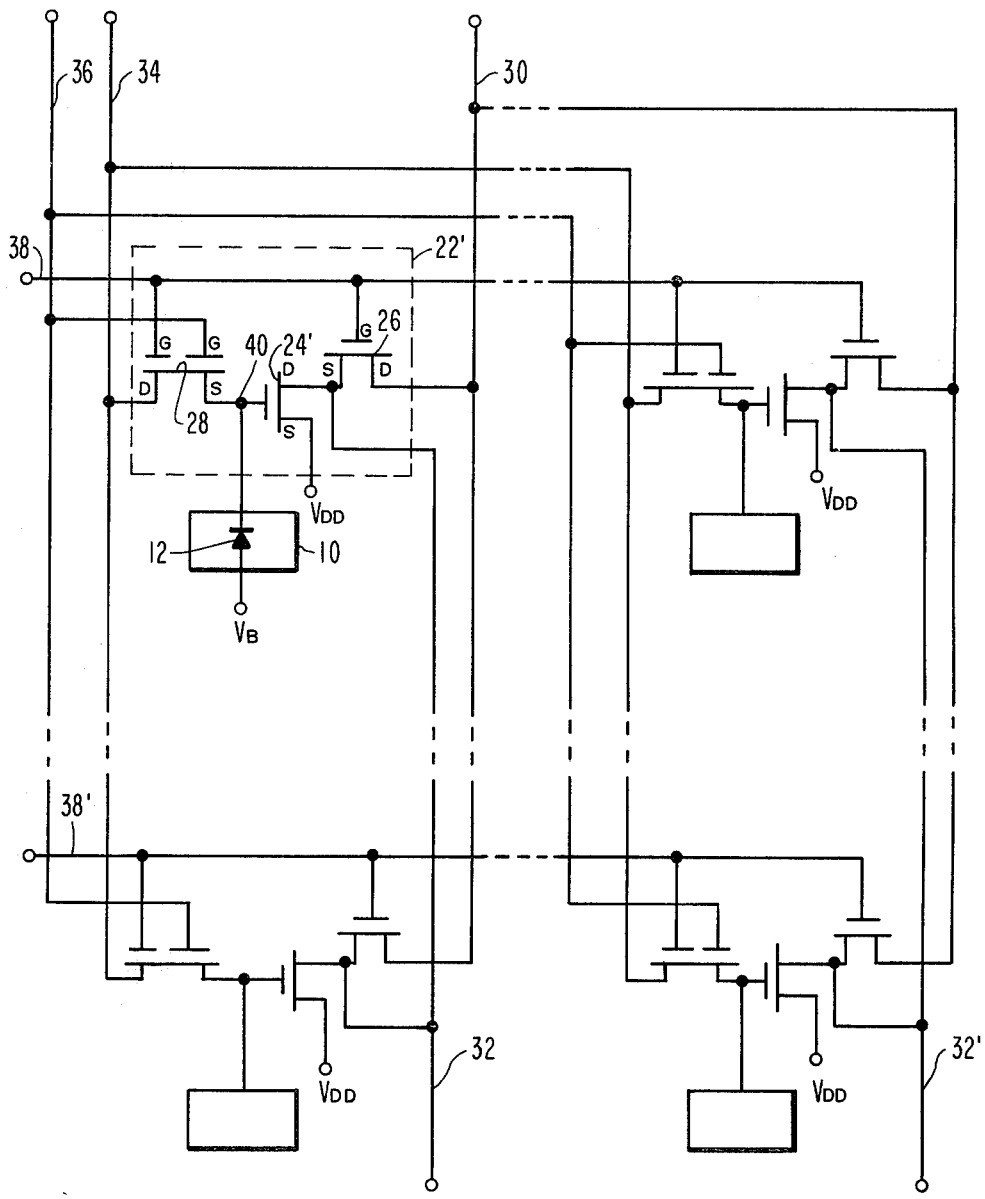
FIG. 5 is a simplified schematic diagram of an alternative embodiment of the invention.

FIG. 5 is a schematic diagram of an alternative embodiment of the invention wherein a different output circuit 22' is substituted for the output circuit 22 of FIG. 2. The different output circuit 22' comprises an inverter rather than a source follower. In this embodiment, the output line 32 is connected between the source of the enable transistor 26 and the drain of an inverting transistor 24'. The source of the inverting transistor 24' is connected to a source voltage supply $V_{ss}$. Operation of the alternative embodiment of FIG. 5 is similar to the operation described previously in connection wth FIG. 2. Thus, the source follower of FIG. 2 may be replaced by the inverter of FIG. 5 or a suitable equivalent transistorized output circuit formed on the same semiconductive substrate with the detector array.

Although the invention has been described as a monolithic focal plane array wherein the detectors and the output circuits are formed in or over the same substrate, the invention may also be implemented in a hybrid focal plane array wherein the detectors are formed in one substrate, the output circuits in another substrate, the two substrates being a single hybrid structure. Monolithic and hybrid focal plane arrays are discussed in Sequin et al, *Charge Transfer Devices*, Academic Press, N.Y., 1975, at pages 197–200.

In summary, the invention is an imaging detector array having the low noise characteristics of transistorized circuits and the low capacitance and high density of charge coupled device imagers.

What is claimed is:

1. A focal plane array, comprising:
   a semiconductive substrate;
   a plurality of photodetectors formed on said semiconductive substrate;
   a plurality of transistorized output circuits formed on said substrate, each of said output circuits comprising at least one metal oxide semiconductor field effect transistor formed on said semiconductive substrate adjacent a corresponding one of said detectors, a floating output node connected to said transistor and said corresponding one detector, means for periodically resetting the potential of said floating node, and a voltage output terminal having a voltage at least periodically determined by the corresponding one of said detectors.

2. The device of claim 1 further comprising a row enable transistor connected between the drain of said source follower transistor and a row enable line, and a reset transistor connected between the gate of said source follower transistor and a reset line.

3. The device of claim 1 wherein said source follower transistor includes a gate electrode, said floating node being connected to said gate electrode.

4. The device of claim 1 further comprising means for selectively resetting said floating node and enabling said source follower transistor.

5. An integrated transistorized imager, comprising:
   a semiconductor substrate;
   a plurality of photodetector diodes formed in said substrate and organized by row and column;
   a plurality of row enable lines associated with corresponding ones of said rows;
   a plurality of column output lines associated with corresponding ones of said columns;
   a plurality of output circuits associated with corresponding ones of said detectors, each of said output circuits comprising:
   a field effect transistor formed on said substrate adjacent a corresponding detector, said transistor comprising a source, a drain and a gate, said gate connected to said detector;
   means connected to the corresponding one of said row enable lines for at least periodically connecting the drain of said transistor to a drain voltage source; and
   means connected to said one row enable line and connected to receive a reset clock signal for periodically resetting the potential of said transistor gate.

6. The device of claim 5 wherein said connecting means comprises an enable transistor formed on said semiconductor substrate adjacent said field effect transistor, said enable transistor having its own source, drain and gate, said enable transistor source connected to said field effect transistor gate and said enable transistor drain connected to said drain voltage source, the gate of said enable transistor connected to the corresponding one of said row enable lines.

7. The device of claim 6 wherein said resetting means comprise a dual gate transistor formed on said semiconductive substrate having two gates and a source and a drain, one of said two gates being connected to receive a periodic clock signal $\phi_{rst}$ and the other of said gates connected to the corresponding one of said row enable lines, said reset transistor source being connected to said field effect transistor gate, and said drain of said reset transistor being connected to a reset voltage source.

8. The device of claim 5 wherein said field effect transistor comprises a source follower transistor.

9. The device of claim 8 wherein said field effect transistor comprises an inverter.

* * * * *

UNITED STATES PATENT AND TRADEMARK OFFICE
CERTIFICATE OF CORRECTION

PATENT NO. : 4,445,117

DATED : April 24, 1984

INVENTOR(S) : Gaalema et al

It is certified that error appears in the above—identified patent and that said Letters Patent is hereby corrected as shown below:

Column 1, line 4, insert the following sentence at the beginning of the specification:

--The Government has rights in this invention pursuant to Contract No. DASG60-78-C-0035 awarded by the Department of the Army.--

Column 1, line 7, "plurlity" should read --plurality--.

Claim 9, line 52, the claim reference numeral "8" should read --5--.

Signed and Sealed this

Fourth Day of December 1984

[SEAL]

Attest:

Attesting Officer

GERALD J. MOSSINGHOFF

Commissioner of Patents and Trademarks